US012662194B2

(12) United States Patent
Robertson, Jr. et al.

(10) Patent No.: US 12,662,194 B2
(45) Date of Patent: Jun. 23, 2026

(54) SENSOR ASSEMBLY

(71) Applicant: Ford Global Technologies, LLC, Dearborn, MI (US)

(72) Inventors: Michael Robertson, Jr., Garden City, MI (US); Venkatesh Krishnan, Canton, MI (US); Segundo Baldovino, Novi, MI (US); Thomas F. Boettger, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 370 days.

(21) Appl. No.: 18/359,321

(22) Filed: Jul. 26, 2023

(65) Prior Publication Data

US 2025/0033705 A1 Jan. 30, 2025

(51) Int. Cl.
B62D 25/06 (2006.01)
G01D 11/30 (2006.01)

(52) U.S. Cl.
CPC ............. B62D 25/06 (2013.01); G01D 11/30 (2013.01)

(58) Field of Classification Search
CPC ................................ B62D 25/06; G01D 11/30
See application file for complete search history.

(56) References Cited

U.S. PATENT DOCUMENTS

| | | | |
|---|---|---|---|
| 6,857,693 B2 | 2/2005 | Hattass et al. | |
| 9,919,748 B2 * | 3/2018 | Williams | ............... B62D 35/00 |
| 2022/0289006 A1 * | 9/2022 | Huelsen | .................. B60R 11/04 |
| 2023/0074027 A1 * | 3/2023 | Ehrmann | .............. B60S 1/0822 |
| 2024/0190360 A1 * | 6/2024 | Huelsen | ..................... B60J 7/02 |

FOREIGN PATENT DOCUMENTS

| | | |
|---|---|---|
| CN | 101992673 A | 3/2011 |
| CN | 114312589 A | 4/2022 |
| CN | 218085332 U | 12/2022 |

OTHER PUBLICATIONS

Ulrich, "Volvo and Lidar-maker Luminar to Deliver Hands-free Driving by 2022 > Level 3 capability would be an industry first", Volvo and Lidar-maker Luminar to Deliver Hands-free Driving by 2022—IEEE Spectrum, https://spectrum.ieee.org/volvo-and-lidarmaker-luminar-to-deliver-handsfree-driving-by-2022.

* cited by examiner

*Primary Examiner* — Faye M Fleming
(74) *Attorney, Agent, or Firm* — Frank A. MacKenzie; Brooks Kushman P.C.

(57) ABSTRACT

An assembly can include a windshield a transparent roof, a transparent reinforcing beam disposed between the windshield and the transparent roof, and a sensor mounted over the transparent reinforcing beam.

19 Claims, 5 Drawing Sheets

SENSOR ASSEMBLY

BACKGROUND

Autonomous and semi-autonomous vehicles typically include a variety of sensors. Some sensors detect the position or orientation of the vehicle, for example, global positioning system (GPS) sensors; accelerometers, such as piezo-electric or microelectromechanical systems; gyroscopes such as rate, ring laser, or fiber-optic gyroscopes; inertial measurement units; and magnetometers. Some sensors detect objects external to a vehicle, for example, radar sensors, cameras, and light detection and ranging (lidar) devices. Sensors may be positioned at locations of a vehicle to provide a field-of-view of an environment external to the vehicle.

DETAILED DESCRIPTION

Figure 1:
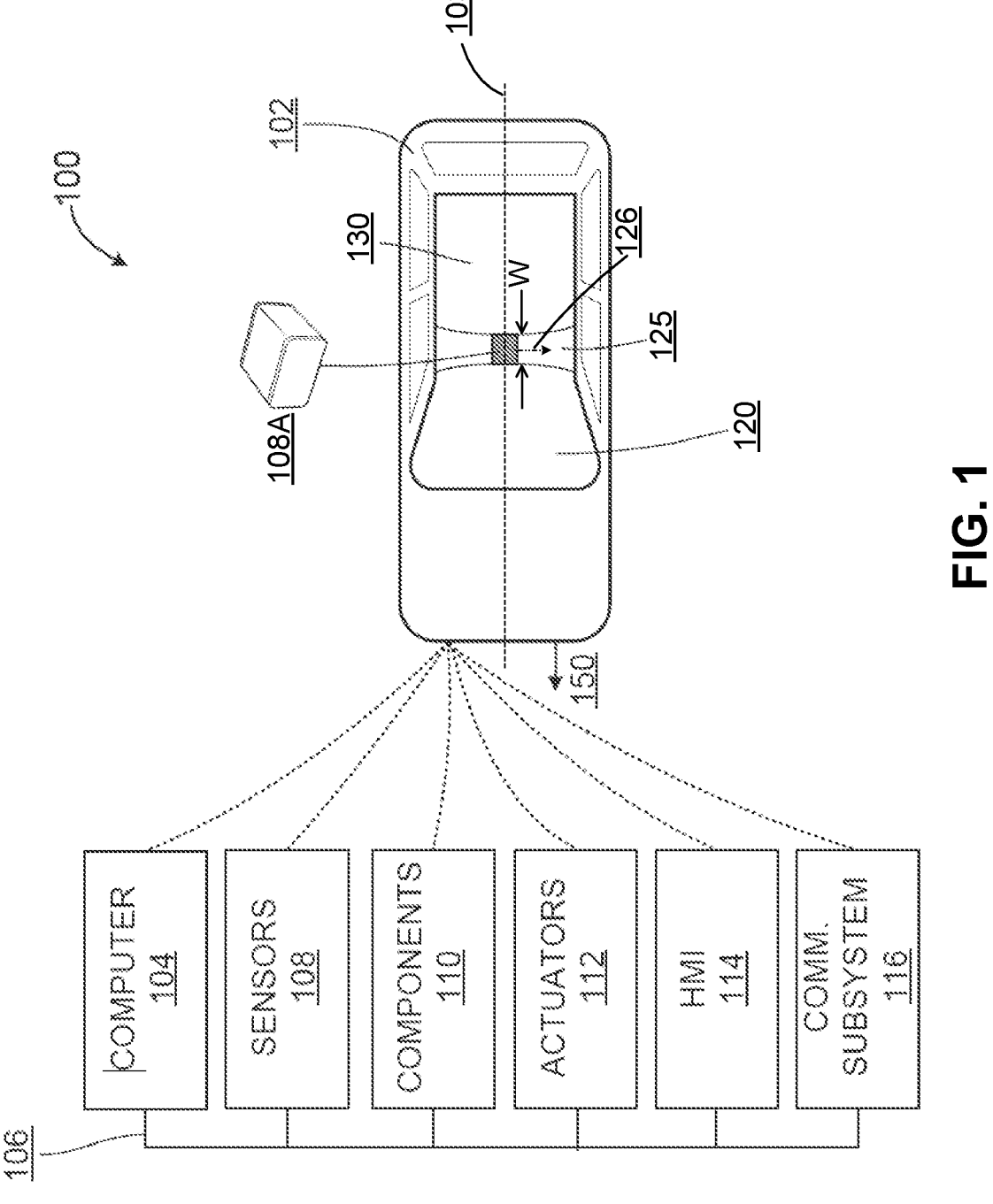
FIG. 1 is a block diagram of an example vehicle.

A sensor assembly can include a windshield, a transparent roof, a transparent reinforcing beam disposed between the windshield and the transparent roof, and a sensor mounted over the transparent reinforcing beam.

The transparent reinforcing beam can be connected to a first side body structural component at a first side of a vehicle.

The transparent reinforcing beam can be connected or coupled to a first side body structural component at a first side of a vehicle. The transparent reinforcing beam can be connected or coupled to a second side body structural component at a second side of the vehicle.

The transparent reinforcing beam can be connected or coupled to a first side body structural component at a first side of a vehicle. The transparent reinforcing beam can be connected or coupled to a second side body structural component at a second side of the vehicle. The transparent reinforcing beam can include an increased width at an edge that is connected to the first side body structural component.

The transparent reinforcing beam can be located apart from a first side body structural component at a first side of a vehicle and apart from a second side body structural component at a second side of the vehicle.

The transparent reinforcing beam can include a glass layer.

The transparent roof can include a glass layer, in which the transparent roof includes a layer of shatter-resistant material adhered to the glass layer.

The transparent roof can include a glass layer, in which the transparent roof includes a layer of resin adhered to the glass layer.

The transparent roof can include a glass layer, in which the transparent roof includes a layer of polyvinyl butyrate material adhered to the glass layer.

The windshield and the transparent roof can form a unitary structure.

The transparent reinforcing beam can be configured to bear a weight of the sensor of between 1.5 kilograms and 4.0 kilograms.

The transparent reinforcing beam can be laminated on a unitary structure that includes the windshield and the transparent roof.

The transparent reinforcing beam can be laminated on a unitary structure that includes the windshield and the transparent roof. The transparent reinforcing beam can include a region having an increased thickness of glass under the sensor mount with respect to a surrounding area of glass.

The transparent reinforcing beam can be laminated on a unitary structure that includes the windshield and the transparent roof, in which the transparent reinforcing beam includes a region having an increased thickness of glass under the sensor mount, with respect to the remainder of the transparent reinforcing beam, in which the region can extend upward from an exterior surface of the unitary structure.

The transparent reinforcing beam can be laminated on a unitary structure that includes the windshield and the transparent roof, in which the transparent reinforcing beam can include a region having an increased thickness of glass under the sensor mount with respect to a surrounding area of glass, and in which the region can extend downward from an interior surface of the unitary structure.

The sensor assembly can additionally include one or more electrical conductors routed over a rearward portion of the transparent roof and connected to the sensor.

The sensor assembly can additionally include a fluid conduit routed over a rearward portion of the transparent roof and connected to a fluid nozzle aimed at a surface of the sensor.

The midpoint of a sensor of the sensor assembly can be mounted so as to position the midpoint of the mounted sensor at a location along a longitudinal axis of the windshield and the transparent roof.

The midpoint of the mounted sensor can be positioned at a location that is offset by 15 centimeters or less with respect to a longitudinal axis of the windshield and the transparent roof.

The sensor mounting on the transparent reinforcing beam can prevent the sensor from undergoing displacement, in any axis, of between 4.0 millimeters and 6.0 millimeters and from undergoing angular displacement about an axis parallel to a longitudinal axis of the vehicle of between 2.0° and 5.0°.

With reference to the Figures, wherein like numerals indicate like parts throughout the several views, FIG. 1 is a block diagram of an example vehicle 100. Vehicle 100 can include a land vehicle, such as a car, truck, a sport utility vehicle, a crossover, a van, a minivan, a taxi, a bus, etc. Vehicle 100 includes vehicle body 102. Vehicle 100 may be of a unibody construction, in which a frame and body 102 of vehicle 100 are a single component. Vehicle 100 may, alternatively, be of a body-on-frame construction, in which the frame supports body 102 that is a separate component from the frame. The frame and body 102 may be formed of any suitable material, for example, steel, aluminum, etc.

Vehicle 100 may additionally include computer 104, which may utilize vehicle communications bus 106 to communicate with sensor set 108, vehicle components 110, actuators 112, human-machine interface (HMI) 114, and communication subsystem 116. Computer 104 may include programming to operate one or more brakes of vehicle 100, propulsion (e.g., control of acceleration in the vehicle by controlling one or more of an internal combustion engine, electric motor, hybrid engine, etc.), steering, climate control, interior and/or exterior lights, etc. Vehicle communications bus 106 can include an internal wired and/or wireless network, such as a controller area network (CAN) or the like, and/or other wired and/or wireless mechanisms. Vehicle computer 104 includes a processor and a memory, which can include one or more forms of computer-readable media, and stores instructions executable by vehicle computer 104 for performing various operations, including those disclosed herein. Computer 104 may include or be communicatively coupled to more than one processor, e.g., included in electronic controller units (ECUs) or the like included in vehicle 100 for monitoring, actuating, and/or controlling various vehicle actuators 112, e.g., a powertrain actuator, a brake actuator, a steering actuator, electromechanical actuators etc. Further, vehicle computer 104 may receive signals, via communications subsystem 116, from a satellite positioning system, e.g., GPS.

Sensor set 108 of vehicle 100 can include any sensor for detecting the attributes of an environment external to vehicle 100, such as objects and/or characteristics of surroundings of vehicle 100. Accordingly, sensor set 108 may operate to detect other vehicles, road markings, traffic lights and/or signs, pedestrians, etc. For example, sensor set 108 may include radar sensors, ultrasonic sensors, lidar devices, and image processing sensors such as cameras. As an example, computer 104 may obtain an estimate of the position of vehicle 100, which may include, for example, fusing output data from sensor set 108 with satellite positioning signals from GPS satellites. The location data may be in a known form, e.g., geo-coordinates in a global-reference frame (i.e., latitudinal and longitudinal). Sensors of sensors set 108 can include any number of additional devices, which may be mounted at a top portion of vehicle 100, at a rear portion of vehicle 100, at a front windshield, around vehicle 100, etc. Such sensors may provide relative locations, sizes, and shapes of objects and/or conditions surrounding vehicle body 102. Sensors of sensor set 108 may cooperate with each other to provide sensor fusion capabilities. For example, sensor 108A may include a lidar sensor, which may cooperate with a camera sensor to provide, for example, a range to a camera-detected object. Thus, in one example, a camera device of sensor set 108 may capture an image of a stationary or moving object located in a forward direction of vehicle 100. Sensor 108A (e.g., a lidar sensor) may then provide range data, which may permit sensor fusion processing programming of computer 104 to determine a distance between the camera-detected object and vehicle 100.

Vehicle body 102 can include windshield 120, which may extend from the front hood of vehicle body 102 and may terminate at a front portion of transparent roof 130. Transparent roof 130 may extend from the rear edge of windshield 120 to provide an upper boundary of the cabin of vehicle body 102. Accordingly, windshield 120 and transparent roof 130 may provide operators and passengers of vehicle 100 to view objects to the front of the vehicle as well as objects above the vehicle as the vehicle proceeds along path 150.

In the example of FIG. 1, sensor 108A can be mounted on transparent roof 130 so as to provide visibility of objects in any direction in the driving environment external to vehicle 100. As shown in FIG. 1, the midpoint of sensor 108A can be mounted so as to coincide with vehicle longitudinal axis 103. Mounting of sensor 108A such that the midpoint of the sensor coincides with vehicle longitudinal axis 103 may provide a sensor field-of-view that is substantially equal in all directions with respect to vehicle body 102. In another example, the midpoint of sensor 108A can be offset to the left or to the right of vehicle longitudinal axis 103. For example, sensor 108A can be offset from vehicle longitudinal axis 103, as shown by arrow 126, so as to provide an enhanced field-of-view of objects located to the left-hand side of vehicle body 102 with respect to the right-hand side of the vehicle body. In an example, the sensor 108A can be offset from vehicle longitudinal axis 103 by an amount of up to 15 centimeters.

Transparent roof 130 may include transparent reinforcing beam 125, which may bear the weight of sensor 108A. In an example, sensor 108A can include a weight of between 1.5 kilograms and 4.0 kilograms. Accordingly, to assist transparent roof 130 in bearing the weight of sensor 108A, transparent roof 130 may include transparent reinforcing beam 125. Transparent reinforcing beam 125 may include mounting provisions, such as a urethane mount and a metallic structure, which operate to secure sensor 108A to transparent roof 130. In an example, mounting provisions for sensor 108A may restrain sensor 108A from translational movement, with respect to any axis, of between 4.0 millimeters and 6.0 millimeters. Mounting provisions for sensor 108A may additionally restrain sensor 108A from rotational movement, such as along an axis parallel to vehicle longitudinal axis 103, of between 2.0° and 5.0°. Via constraining movement of sensor 108A, the sensor may be capable of cooperating with other sensors of sensor set 108 so as to permit sensor fusion processing of computer 104 to determine, for example, the distance and a direction to a lidar-detected object and a camera-detected object.

Transparent reinforcing beam 125 may be oriented in a direction that is horizontal and perpendicular, or substantially perpendicular, to vehicle longitudinal axis 103. In one example, transparent reinforcing beam 125 may include a single width as the beam extends laterally (e.g., across) a vehicle-front portion of transparent roof 130. Transparent reinforcing beam 125 may extend from a first (e.g., left-hand side) side structural component (e.g., 202B of FIG. 2A) of vehicle body 102 to a second (e.g., right-hand side) side structural component (e.g., 202A) of vehicle body 102. Transparent reinforcing beam 125 may be supported by first side body structural component 202A and second side body structural component 202B. As shown, transparent reinforcing beam 125 includes an increased width at the lateral edge of the beam that is connected to a side structural component of vehicle body 102 with respect to the width of a portion of the beam intersecting vehicle longitudinal axis 103. In other examples, transparent reinforcing beam 125 can include a constant width as the beam extends between the first (e.g., left) side structural components and the second (e.g., right) side structural component (e.g., 202A, 202B) of vehicle body 102.

Figure 2A:
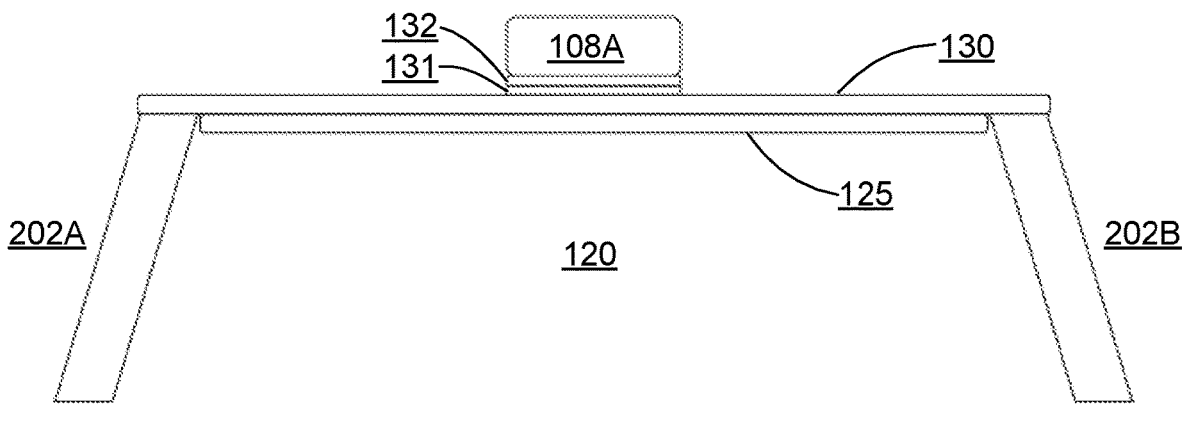
FIGS. 2A-2C are front views of a portion of an example vehicle showing a sensor mounted to a transparent reinforcing beam.

FIG. 2A is a front view of a portion of an example vehicle showing a sensor mounted to transparent reinforcing beam 125. As shown in FIG. 2A, a downward facing surface of sensor 108A may contact adhesion layer 132, which operates to adhere sensor 108A to mounting layer 131. In an example, adhesion layer 132 may include a polyurethane adhesive, an epoxy adhesive, a cyanoacrylate adhesive, or any other suitable compound that can bond the downward facing surface of sensor 108A to a mounting layer 131. In an example, mounting layer 131 may include aluminum, stainless steel, etc. Accordingly, adhesion layer 132 and mounting layer 131 operate to rigidly couple sensor 108A to transparent roof 130 so as to prevent movement of the sensor by more than 6 millimeters with respect to vehicle body 102. Layers 132 and 131 may additionally operate to restrain angular displacement, such as with respect to an axis parallel to vehicle longitudinal axis 103, to a maximum that is between 2° and 5°.

In FIG. 2A, transparent reinforcing beam 125 is shown as extending in a downward direction (e.g., from an interior surface) with respect to transparent roof 130 and windshield 120. Accordingly, transparent reinforcing beam 125 may be connected or fastened to first side body structural component 202A and to second side body structural component 202B from a location under or beneath transparent roof 130 and windshield 120. This location for transparent reinforcing beam 125 may provide smoother airflow from windshield 120 to transparent roof 130. Transparent reinforcing beam 125 and transparent roof 130 may include shatter-resistant glass, in which, during a manufacturing process, a shatter-resistant material, such as a layer of resin is disposed between first and second glass layers of the transparent reinforcing beam and the transparent roof. A suitable resin can include a layer of polyvinyl butyrate.

Figure 2B:
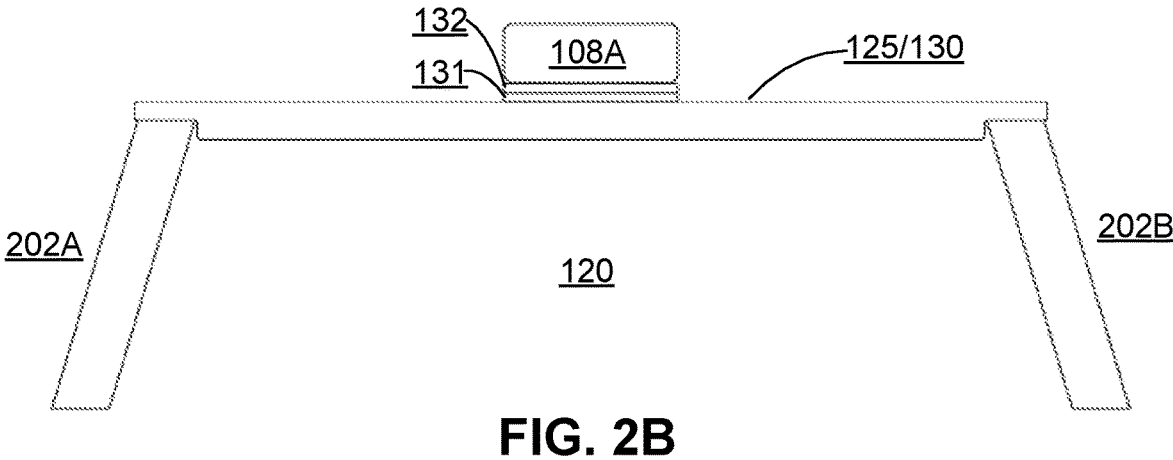

In FIG. 2B, transparent reinforcing beam 125 is shown as being integrated within transparent roof 130. In such an example, transparent reinforcing beam 125, transparent roof 130, and possibly windshield 120 may form a unitary structure upon which mounting layer 131, adhesion layer 132, and sensor 108A may be mounted. In the context of this disclosure, the term "unitary" is defined as being a single piece of material. Accordingly, in an example, transparent reinforcing beam 125, transparent roof 130, and possibly windshield 120 may be formed during a single manufacturing process that excludes a separate process of adhering, fitting, and/or transitioning transparent reinforcing beam 125 with transparent roof 130.

Figure 2C:
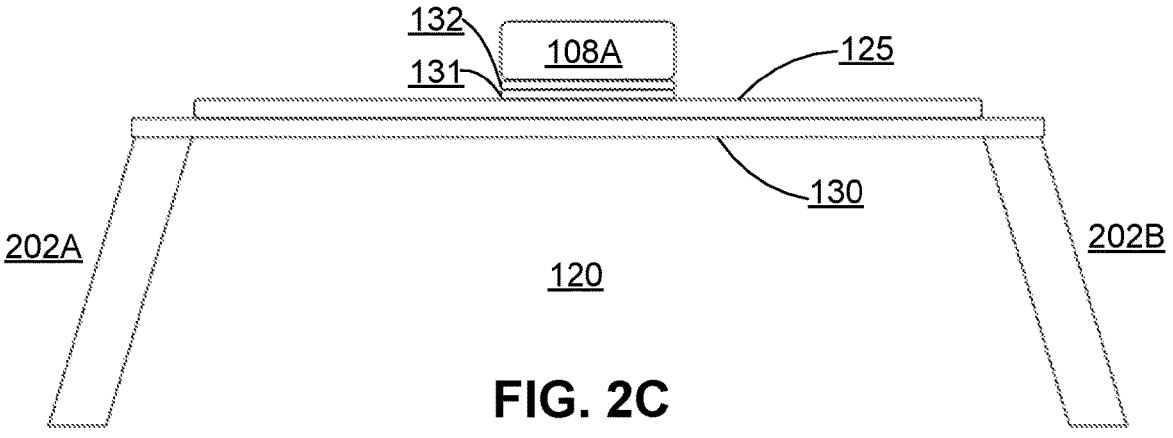

In FIG. 2C, transparent reinforcing beam 125 is shown as extending in an upward direction (e.g., from an exterior surface) with respect to transparent roof 130. Accordingly, transparent reinforcing beam 125 may be connected or fastened to first side body structural component 202A and to second side body structural component 202B from a location on or over transparent roof 130. This location for transparent reinforcing beam 125 may provide for case of manufacturing.

Figure 3A:
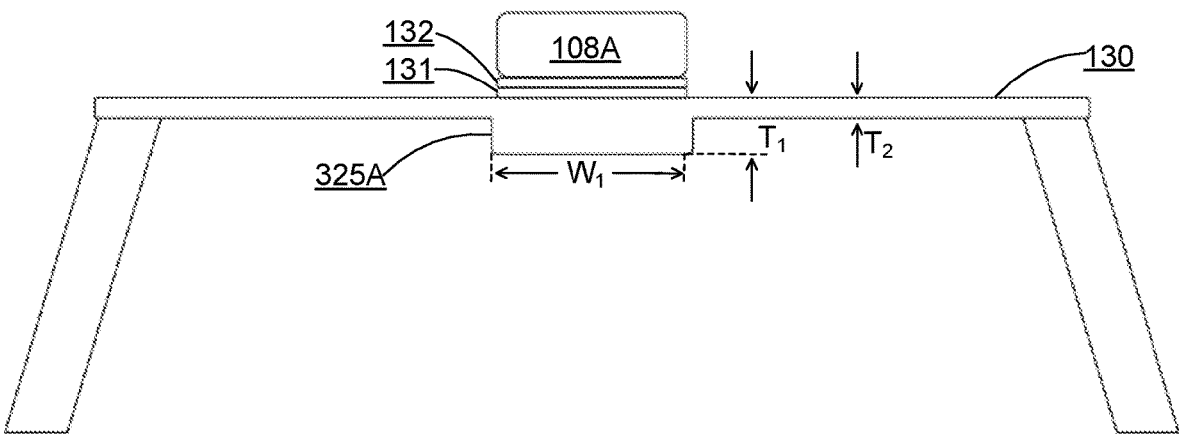
FIGS. 3A-3B are front views of a sensor mounted to a transparent reinforcing beam having a region of increased thickness of glass under the sensor mount.
Figure 3B:
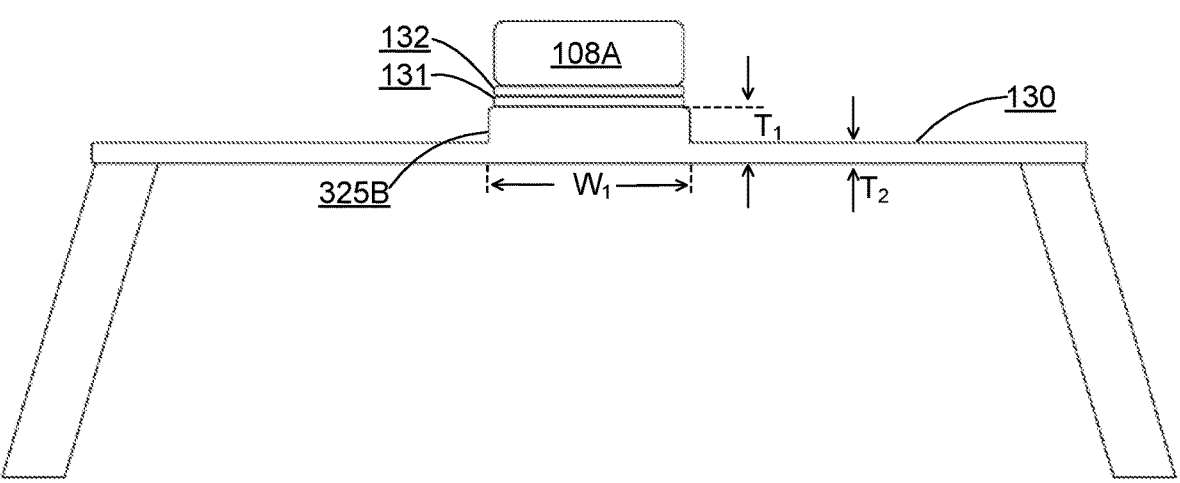

FIGS. 3A-3B are front views of a sensor mounted to a transparent reinforcing beam (325A, 325B) having a region of increased thickness of glass under the sensor mount. In FIG. 3A, sensor 108A is shown as being positioned above transparent reinforcing beam 325A, in which transparent reinforcing beam 325A extends upward from the plane of transparent roof 130. In FIG. 3B, transparent reinforcing beam 325B extends downward from the plane of transparent roof 130. Thus, as shown in FIGS. 3A and 3B, transparent reinforcing beams 325A and 325B are located apart from first side body structural component 202A and apart from second side body structural component 202B. Transparent reinforcing beam 325A and transparent roof 130 may include a thickness $T_1$ that is between 20% and 100% greater than the thickness ($T_2$) of the surrounding or remaining areas of transparent roof 130. In the example of FIG. 3A, transparent reinforcing beam 325A includes a width ($W_1$) in a lateral direction relative to vehicle 100 similar to the width of sensor 108A. In other examples, reinforcing beam 325A may include a width ($W_1$) that is greater than the width of sensor 108A, so as to provide increased stiffness and structural support of sensor 108A.

Figure 4:
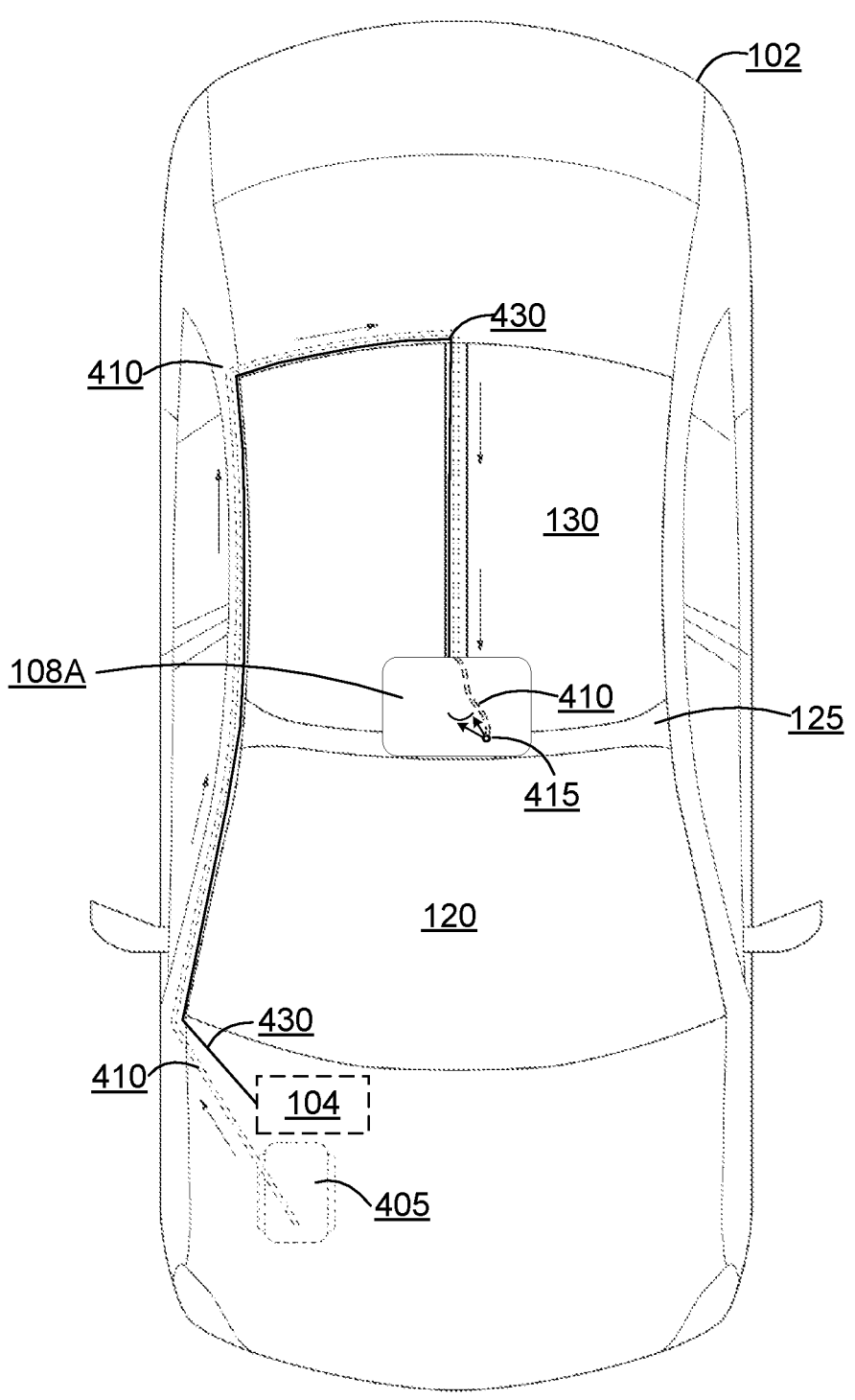
FIG. 4 is a top view of a vehicle showing a transparent reinforcing beam, in which a sensor may be mounted over the transparent reinforcing beam.

FIG. 4 is a top view of a vehicle showing a sensor assembly. In FIG. 4, windshield 120 and transparent roof 130 may be formed as a unitary structure in which a single piece of shatter-resistant glass extends from a rear edge of the hood of vehicle body 102 to a rear portion of vehicle body 102. In an example, since windshield 120 and transparent roof 130 are formed as a unitary glass structure without a scam or joint between the windshield and the transparent roof.

As shown in FIG. 4, nozzle 415 may be aimed at a surface of sensor 108A, so as to be capable of providing intermittent cleaning of the surface of sensor 108A. In an example, fluid conduit 410 may convey pressurized fluid from fluid reservoir 405, which may be filled with, for example, windshield washer fluid. Via fluid conduit 410, fluid may travel from fluid reservoir 405 along a lateral edge of windshield 120. Fluid travel may continue along the lateral edge of transparent roof 130 to a rear portion of transparent roof 130. The fluid may then be routed along a rearward portion of transparent roof 130 toward the center of transparent roof 130 before being directed in a vehicle-forward direction to sensor 108A so as to be available for cleaning a sensor surface of sensor 108A via nozzle 415.

Figure 5:
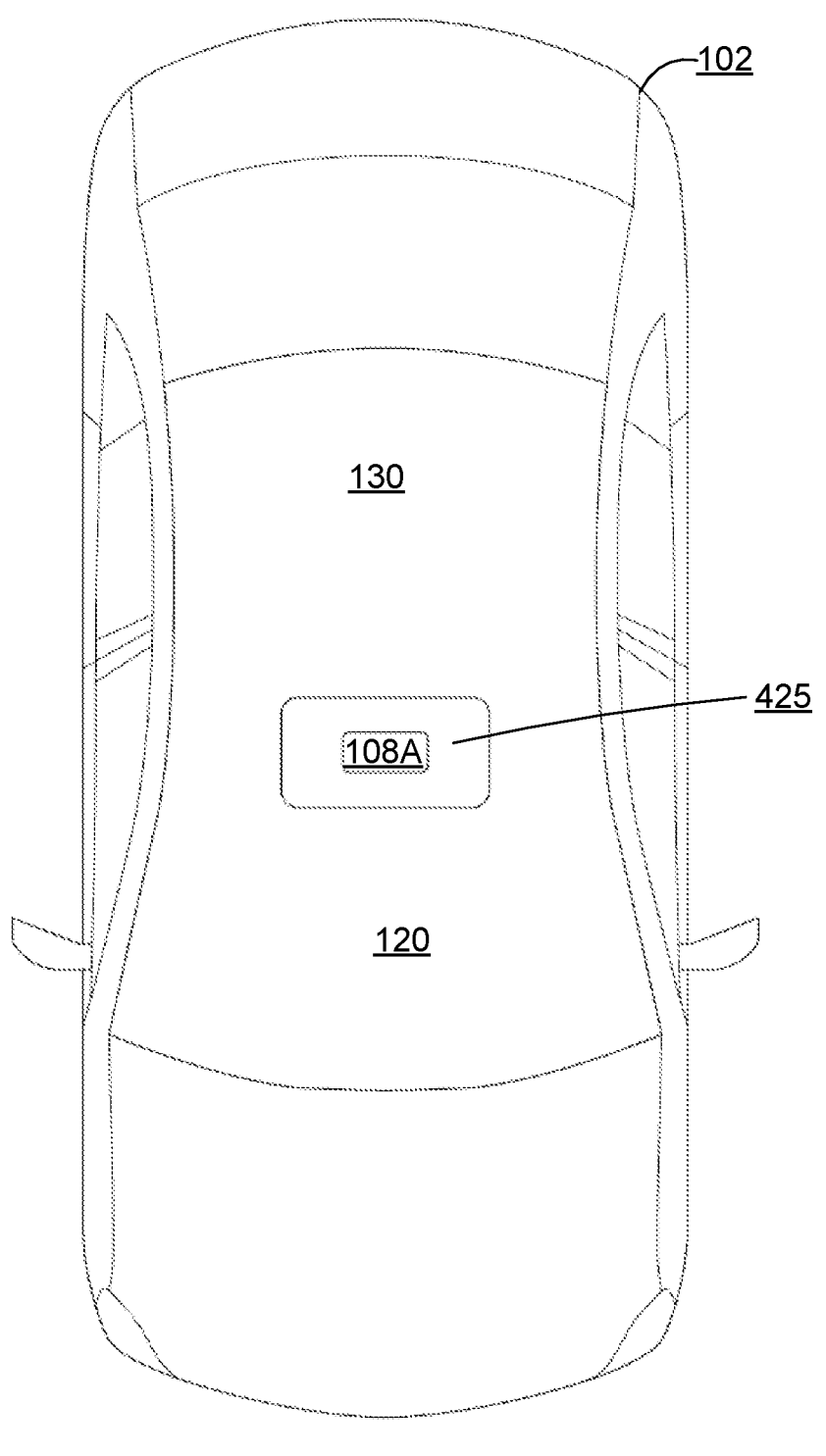
FIG. 5 is a top view of a vehicle showing a sensor assembly.

One or more electrical conductors 430 may additionally be routed from computer 104, which may be located beneath within vehicle body 102, to communicate with sensor 108A. As shown in FIG. 5, one or more conductors may be routed along the lateral edge of windshield 120 and along the lateral edge of transparent roof 130. The electrical conductors can then be routed toward the center of transparent of 130 before being directed in a vehicle-forward direction to sensor 108A. Routing of fluid conduit 410 and electrical conductors 430 in a rearward direction along lateral edges of windshield 120 and transparent roof 130 operates to maintain the fluid lines and electrical conductors out of view of the passengers and operators of vehicle 100.

FIG. 5 is a top view of a vehicle showing transparent reinforcing beam 425, in which a sensor may be mounted over the transparent reinforcing beam. In the example of FIG. 5, transparent reinforcing beam 425 may be located within an area of transparent roof 130 and apart from first side body structural component 202A and second side body structural component 202B of vehicle body 102. Accordingly, an area occupied by transparent reinforcing beam 425 may be much less than an area occupied by transparent reinforcing beam 125 of FIG. 1, for example.

In general, the computing systems and/or devices described may employ any of a number of computer operating systems, including, but by no means limited to, versions and/or varieties of the Ford Sync® application, App-Link/Smart Device Link middleware, the Microsoft Automotive® operating system, the Microsoft Windows® operating system, the Unix operating system (e.g., the Solaris® operating system distributed by Oracle Corporation of Redwood Shores, California), the AIX UNIX operating system distributed by International Business Machines of Armonk, New York, the Linux operating system, the Mac OSX and iOS operating systems distributed by Apple Inc. of Cupertino, California, the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Python, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Instructions may be transmitted by one or more transmission media, including fiber optics, wires, wireless communication, including the internals that comprise a system bus coupled to a processor of a computer. Common forms of computer-readable media include, for example, RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), a nonrelational database (NoSQL), a graph database (GDB), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In the drawings, the same reference numbers indicate the same elements. Further, some or all of these elements could be changed. With regard to the media, processes, systems, methods, heuristics, etc. described herein, it should be understood that, although the steps of such processes, etc. have been described as occurring according to a certain ordered sequence, such processes could be practiced with the described steps performed in an order other than the order described herein. It should further be understood that certain steps could be performed simultaneously, that other steps could be added, or that certain steps described herein could be omitted.

All terms used in the claims are intended to be given their plain and ordinary meanings as understood by those skilled in the art unless an explicit indication to the contrary is made herein. In particular, use of the singular articles such as "a," "the," "said," etc. should be read to recite one or more of the indicated elements unless a claim recites an explicit limitation to the contrary. The adjectives "first," "second," and "third" are used throughout this document as identifiers and are not intended to signify importance, order, or quantity. Use of "in response to" and "upon determining" indicates a causal relationship, not merely a temporal relationship.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. An assembly, comprising:
a windshield;
a transparent roof;
a transparent reinforcing beam disposed between the windshield and the transparent roof; and
a sensor mounted over the transparent reinforcing beam;
wherein the transparent reinforcing beam is connected to a first side body structural component at a first side of a vehicle;
wherein the transparent reinforcing beam is connected to a second side body structural component at a second side of the vehicle; and
wherein the transparent reinforcing beam includes an increased width at an edge that is connected to the first side body structural component.

2. The assembly of claim 1, wherein the transparent roof comprises a glass layer.

3. The assembly of claim 1, wherein the transparent roof comprises a glass layer, wherein the transparent roof includes a layer of shatter-resistant material adhered to the glass layer.

4. The assembly of claim 1, wherein the transparent roof comprises a glass layer, and wherein the transparent roof includes a layer of resin adhered to the glass layer.

5. The assembly of claim 1, wherein the transparent roof comprises a glass layer, and wherein the transparent roof includes a layer of polyvinyl butyrate material adhered to the glass layer.

6. The assembly of claim 1, wherein the windshield and the transparent roof form a unitary structure.

7. The assembly of claim 1, wherein the transparent reinforcing beam is configured to bear a weight of the sensor of between 1.5 kilograms and 4.0 kilograms.

8. The assembly of claim 1, wherein the transparent reinforcing beam is laminated on a unitary structure that includes the windshield and the transparent roof.

9. The assembly of claim 1, wherein the transparent reinforcing beam is laminated on a unitary structure that includes the windshield and the transparent roof, and wherein the transparent reinforcing beam includes a region having an increased thickness of glass under the sensor mount with respect to a surrounding area of glass.

10. The assembly of claim 1, wherein the transparent reinforcing beam is laminated on a unitary structure that includes the windshield and the transparent roof, and wherein the transparent reinforcing beam includes a region having an increased thickness of glass under the sensor mount, with respect to the remainder of the transparent reinforcing beam, and wherein the region extends upward from an exterior surface of the unitary structure.

11. The assembly of claim 1, wherein the transparent reinforcing beam is laminated on a unitary structure that includes the windshield and the transparent roof, and wherein the transparent reinforcing beam includes a region having an increased thickness of glass under the sensor mount with respect to a surrounding area of glass, and wherein the region extends downward from an interior surface of the unitary structure.

12. The assembly of claim 1, further comprising one or more electrical conductors routed over a rearward portion of the transparent roof and connected to the sensor.

13. The assembly of claim 1, further comprising a fluid conduit routed over a rearward portion of the transparent roof and connected to a fluid nozzle aimed at a surface of the sensor.

14. The assembly of claim 1, wherein the midpoint of the sensor is at a location along a longitudinal axis of the windshield and the transparent roof.

15. The assembly of claim 1, wherein the midpoint of the mounted sensor is at a location that is offset by 15 centimeters or less with respect to a longitudinal axis of the windshield and the transparent roof.

16. The assembly of claim 1, wherein the assembly is mounted on the vehicle, and wherein the sensor mounting on the transparent reinforcing beam prevents the sensor from undergoing displacement, in any axis, of between 4.0 millimeters and 6.0 millimeters and from undergoing angular displacement about an axis parallel to a longitudinal axis of the vehicle.

17. An assembly, comprising:
a windshield;
a transparent roof;
a transparent reinforcing beam disposed between the windshield and the transparent roof;
a sensor mounted over the transparent reinforcing beam; and
one or more electrical conductors routed over a rearward portion of the transparent roof and connected to the sensor.

18. An assembly, comprising:
a windshield;
a transparent roof;
a transparent reinforcing beam disposed between the windshield and the transparent roof; and
a sensor mounted over the transparent reinforcing beam;
wherein the transparent reinforcing beam is laminated on a unitary structure that includes the windshield and the transparent roof, and
wherein the transparent reinforcing beam includes a region having an increased thickness of glass under the sensor mount with respect to a surrounding area of glass.

19. The assembly of claim 17, wherein the transparent reinforcing beam is located apart from a first side body structural component at a first side of a vehicle and apart from a second side body structural component at a second side of the vehicle.

* * * * *